(12) United States Patent
Yoshida et al.

(10) Patent No.: US 11,904,541 B2
(45) Date of Patent: Feb. 20, 2024

(54) THREE-DIMENSIONAL SHAPING DEVICE AND METHOD OF SHAPING

(71) Applicant: HONDA MOTOR CO., LTD., Tokyo (JP)

(72) Inventors: Kotaro Yoshida, Tochigi-ken (JP); Teruo Kamada, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 89 days.

(21) Appl. No.: 17/213,280

(22) Filed: Mar. 26, 2021

(65) Prior Publication Data

US 2021/0299957 A1 Sep. 30, 2021

(30) Foreign Application Priority Data

Mar. 31, 2020 (JP) .................. 2020-064309

(51) Int. Cl.
*B29C 64/241* (2017.01)
*B33Y 10/00* (2015.01)
*B33Y 30/00* (2015.01)
*B33Y 40/00* (2020.01)
*B29C 64/245* (2017.01)
*B29C 64/321* (2017.01)
*B29C 64/232* (2017.01)

(52) U.S. Cl.
CPC .......... *B29C 64/241* (2017.08); *B29C 64/232* (2017.08); *B29C 64/245* (2017.08); *B29C 64/321* (2017.08); *B33Y 10/00* (2014.12); *B33Y 30/00* (2014.12); *B33Y 40/00* (2014.12)

(58) Field of Classification Search
CPC ... B29C 64/214; B29C 64/241; B29C 64/245; B29C 64/329; B29C 64/165; B22F 12/37; B22F 12/60; B22F 12/67
See application file for complete search history.

(56) References Cited

U.S. PATENT DOCUMENTS

| 2006/0108712 | A1 | 5/2006 | Mattes |
| 2017/0173886 | A1 | 6/2017 | Menchik et al. |
| 2020/0346407 | A1* | 11/2020 | Goodwin ............... B29C 64/153 |
| 2021/0138729 | A1* | 5/2021 | John ..................... B29C 64/214 |

(Continued)

FOREIGN PATENT DOCUMENTS

| DE | 102013210242 | 12/2014 |
| EP | 3623139 | 3/2020 |

(Continued)

OTHER PUBLICATIONS

Japanese Office Action for Japanese Patent Application No. 2020-064309 dated Oct. 10, 2023.

*Primary Examiner* — Joseph S Del Sole
*Assistant Examiner* — Ariella Machness
(74) *Attorney, Agent, or Firm* — Amin, Turocy & Watson, LLP

(57) ABSTRACT

A three-dimensional shaping device comprises: a shaping vessel that has an outer peripheral wall and a shaping stand, the shaping stand configuring a bottom portion of the shaping vessel; a rotation mechanism that rotates the shaping stand; and a raising/lowering device that raises/lowers the shaping stand, wherein shaping is performed while the outer peripheral wall and the shaping stand are being rotated at the same angular speed by the rotation mechanism.

8 Claims, 13 Drawing Sheets

(56) References Cited

U.S. PATENT DOCUMENTS

2021/0362413 A1* 11/2021 Van Der Werff ..... B29C 64/357
2022/0212263 A1*  7/2022 Phillips ................ B29C 64/245
2022/0219394 A1*  7/2022 Pan ...................... B29C 64/245

FOREIGN PATENT DOCUMENTS

| JP | 2005-059477 | 3/2005 |
| JP | 2005-534543 | 11/2005 |
| JP | 2007-503342 | 2/2007 |
| JP | 2017-520434 | 7/2017 |
| JP | 6266676 | 1/2018 |
| JP | 2019-081936 | 5/2019 |
| WO | 2004/106041 | 12/2004 |

* cited by examiner

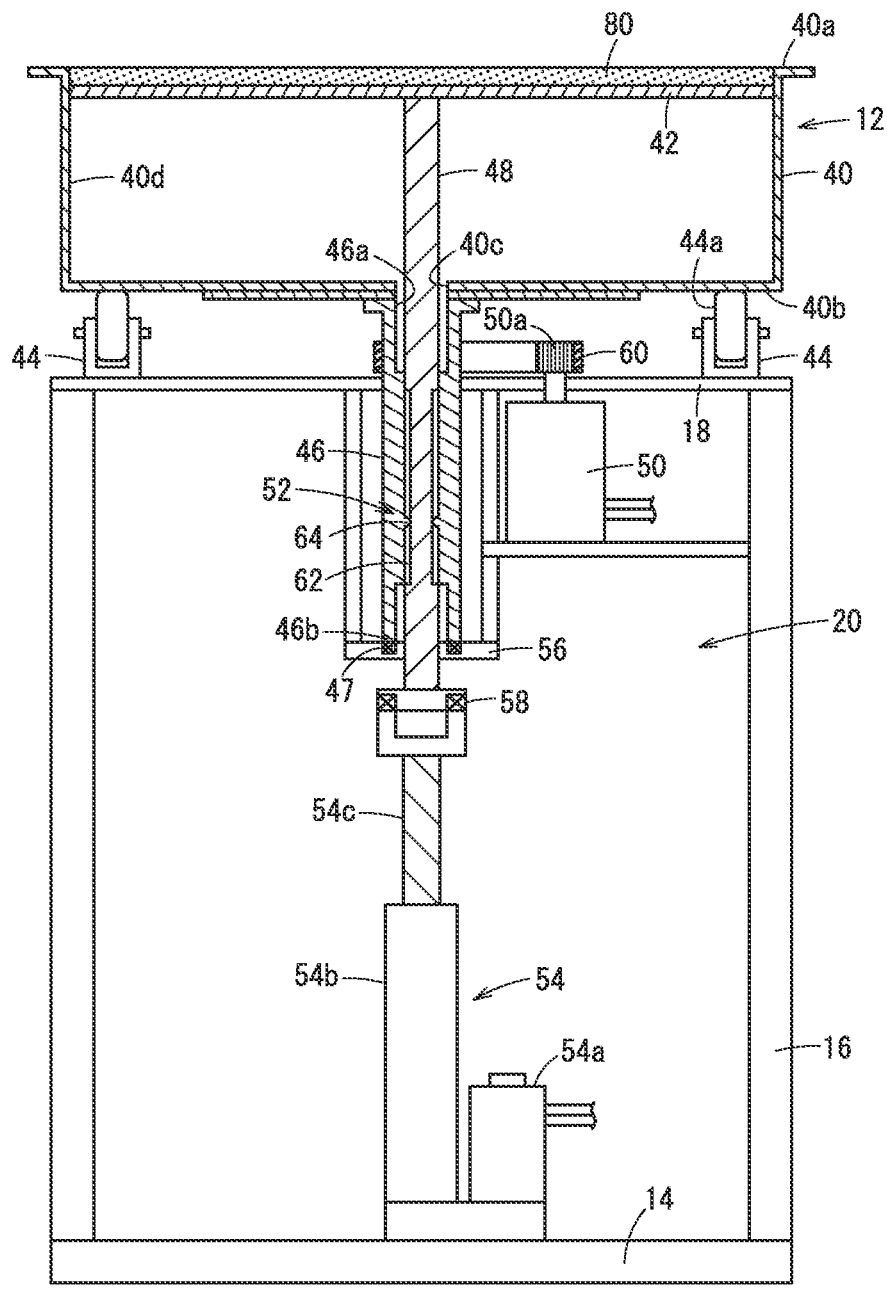

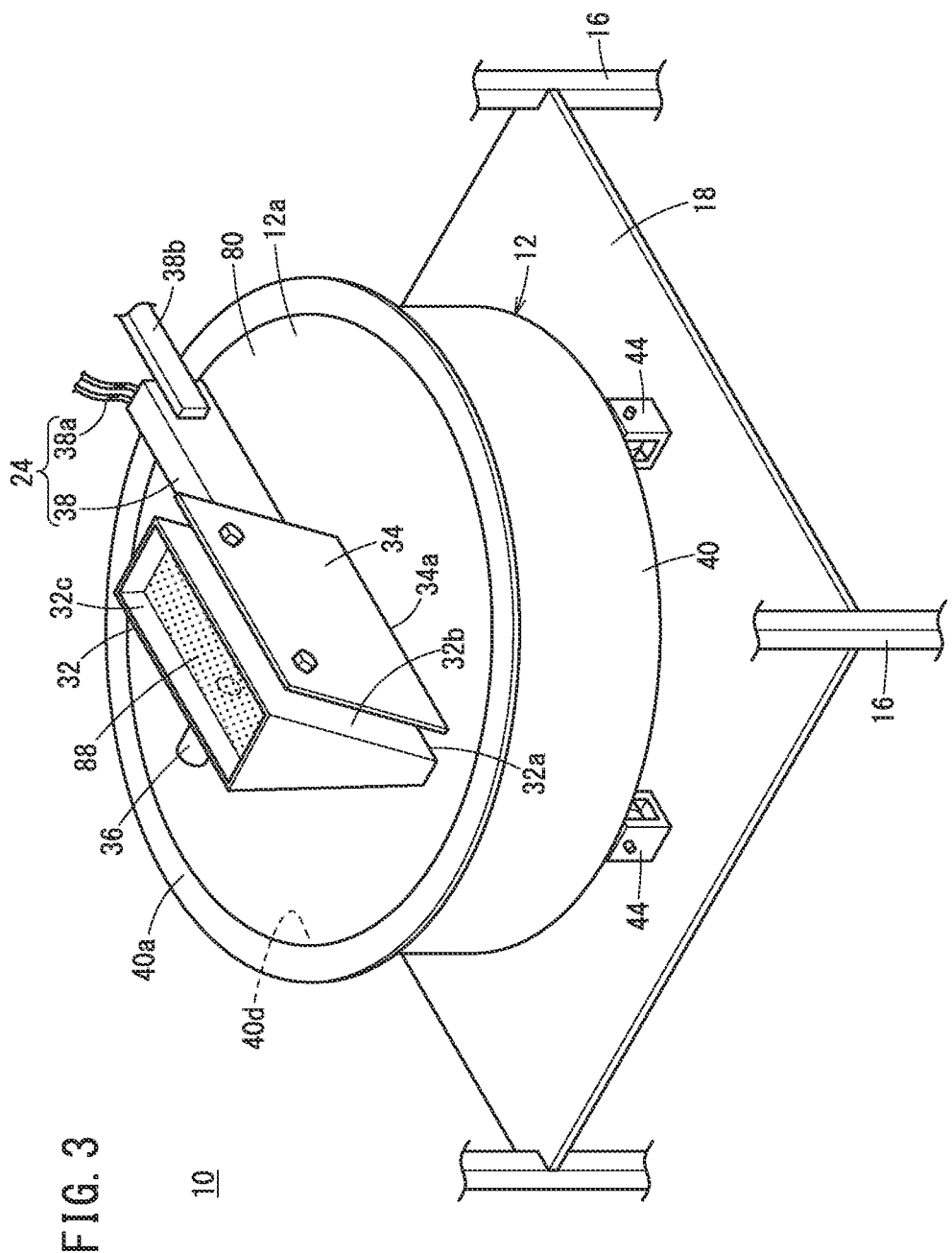

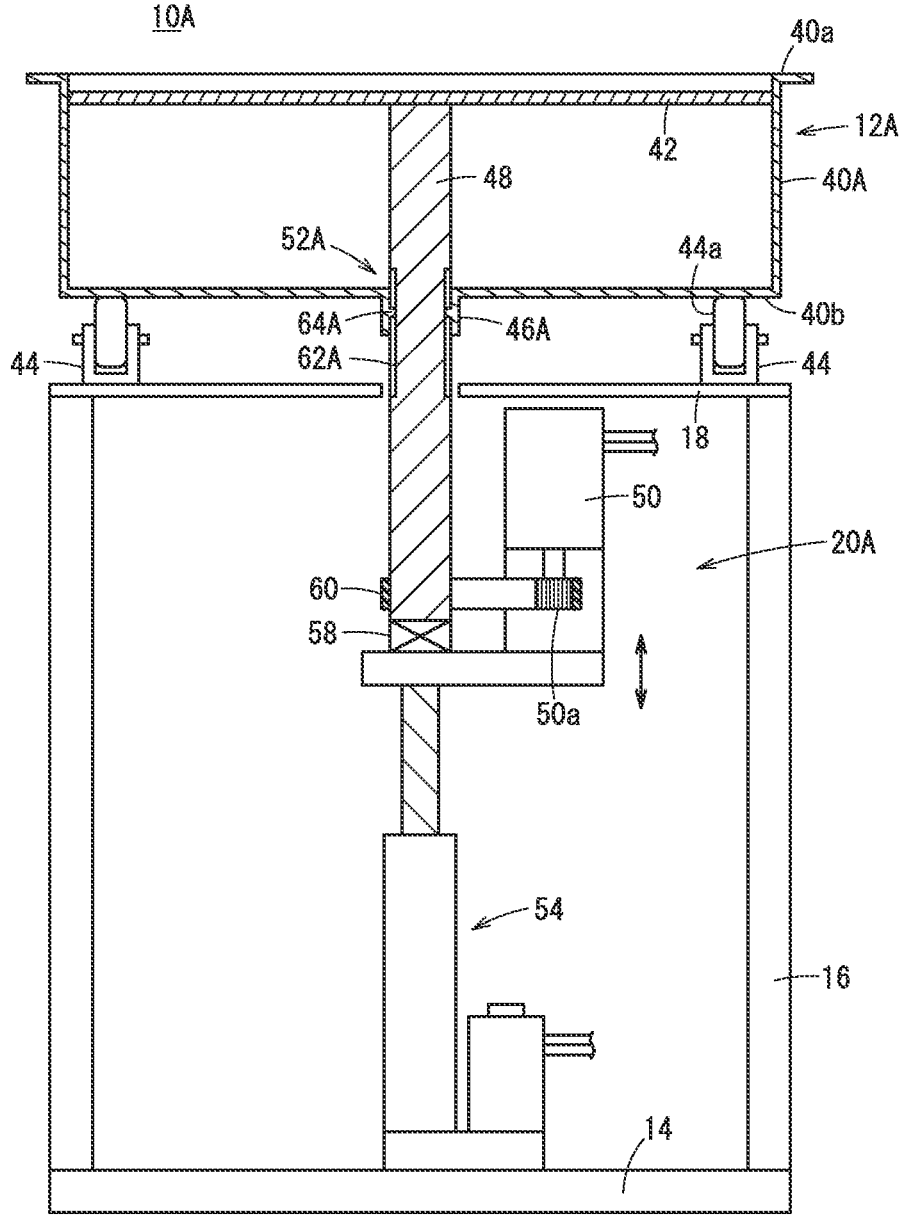

THREE-DIMENSIONAL SHAPING DEVICE AND METHOD OF SHAPING

CROSS-REFERENCE TO RELATED APPLICATION

This application is based upon and claims the benefit of priority from Japanese Patent Application No. 2020-064309 filed on Mar. 31, 2020, the contents of which are incorporated herein by reference.

BACKGROUND OF THE INVENTION

Field of the Invention

The present invention relates to a three-dimensional shaping device and a method of shaping for forming a three-dimensional shaped object by jetting a binder onto a powder layer.

Description of the Related Art

In shaping of a three-dimensional shaped object, there have been proposed a variety of three-dimensional shaping devices that repeat an operation of hardening a necessary portion while overlaying powder in a layered manner. For example, there are the likes of a binder jetting system in which a binder is delivered from an ink jet head (Binder Jetting) and a powder bed fusion binding system in which the powder is solidified by being irradiated with the likes of a laser beam or electron beam (Powder bed fusion). The powder bed fusion binding system, which requires from several minutes to several tens of minutes for shaping of one layer, requires time for the shaping.

On the other hand, the binder jetting system, which is capable of high-speed processing due to there being no need for the powder to be melted, can perform shaping of one layer in a short time of the order of several seconds. With the advancements in ink jet technology of recent years, further improvements in shaping speed are expected.

Incidentally, a three-dimensional shaping device of the binder jetting system performs shaping while forming a powder layer of a shaping material inside a shaping vessel which is configured by a side wall and by a shaping stand that configures a bottom portion of the shaping vessel. However, in a conventional three-dimensional device, in which a step of forming the powder layer and a step of coating with the binder need to be alternately performed, an operation for forming the powder layer is intermittently performed, and a wasteful waiting time occurs. This results in a problem of the shaping speed slowing.

In order to solve such a problem, Japanese Patent No. 6266676 discloses a three-dimensional shaping device that rotates both a supply unit for supplying powder of the shaping material to a cylindrical shaping vessel and a coating unit for performing coating with the binder, and thereby performs formation of the powder layer and coating with the binder in a continuous operation.

SUMMARY OF THE INVENTION

In the three-dimensional shaping device of Japanese Patent No. 6266676, since it is difficult for a stable powder layer to be formed under conditions of a centrifugal force acting, the supply unit and the coating device are rotated at a constant speed with respect to the shaping vessel, without a shaping vessel side being rotated.

However, in the case of the supply unit and the coating device being rotated, it is required that the likes of piping for material supply and power supply wiring are provided in a rotating portion, and device configuration becomes complicated and hence large-scale. Moreover, there is a problem that, due to weight increase of the rotating portion, rotational speed of a shaping unit and the coating device cannot be increased, shaping speed slows, and shaping of mass-produced articles becomes difficult.

Moreover, if, in order to improve the rotational speed, configuring members of the supply unit and coating unit are downsized, then when a comparatively large shaped object is continuously shaped, replenishment of the shaping material and binder becomes necessary, and the device must be stopped midway, so production efficiency worsens.

Accordingly, an embodiment has an object of providing a three-dimensional shaping device and a method of shaping that, while simplifying a structure of a rotating portion, enable formation of a stable powder layer, and excel in shaping speed and production efficiency.

One aspect of the following disclosure is found in a three-dimensional shaping device comprising: a shaping vessel that has an outer peripheral wall and a shaping stand, the shaping stand configuring a bottom portion of the shaping vessel; a rotation mechanism that rotates the shaping stand; and a raising and lowering device that raises and lowers the shaping stand inside the outer peripheral wall, wherein the rotation mechanism rotates the shaping stand and the outer peripheral wall at a same angular speed.

Another aspect is found in a method of shaping employing a three-dimensional shaping device, the three-dimensional shaping device comprising: a shaping vessel that has an outer peripheral wall and a shaping stand, the shaping stand configuring a bottom portion of the shaping vessel; a rotation mechanism that rotates the shaping vessel; a raising and lowering device that raises and lowers the shaping stand with respect to the outer peripheral wall; a chute that is disposed above the shaping stand, and that delivers powder of a shaping material to the shaping vessel; a leveling plate that levels into a flat powder layer the powder that has been supplied from the chute; and a coating device that coats the powder layer with a binder, the method comprising: while continuously rotating the outer peripheral wall and the shaping stand at a same angular speed by the rotation mechanism, forming the powder layer with the chute and the leveling plate, coating the powder layer with the binder using the coating device, and every time the shaping vessel makes one rotation, lowering the shaping stand by the raising and lowering device for a new powder layer to be formed.

Due to the three-dimensional shaping device and the method of shaping of the above-described aspects, a stable powder layer can be formed, structure of a rotating portion is simplified, and shaping speed and production efficiency improve.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 2 is a cross-sectional view of a shaping vessel of FIG. 1 and a drive mechanism thereof;

FIG. 3 is a perspective view showing the shaping vessel, a coating device, and a lower side portion of a chute of the three-dimensional shaping device of FIG. 1;

FIG. 5 is a cross-sectional view of a shaping vessel and a drive mechanism of a three-dimensional shaping device according to a second embodiment;

DESCRIPTION OF THE PREFERRED EMBODIMENTS

Preferred embodiments of a three-dimensional shaping device and a method of shaping will be presented and described in detail below with reference to the accompanying drawings.

First Embodiment

Figure 1:
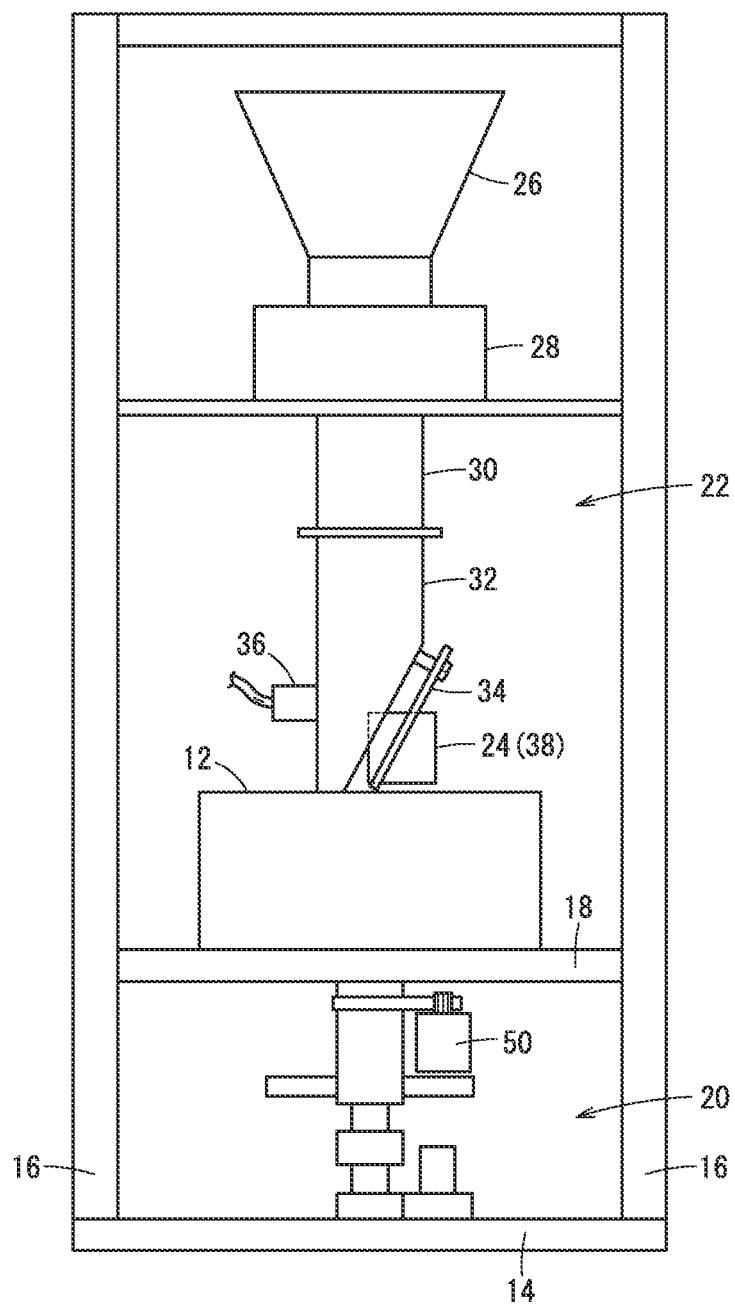
FIG. 1 is a front view of a three-dimensional shaping device according to a first embodiment.

As shown in FIG. 1, a three-dimensional shaping device 10 according to the present embodiment is a system that supplies a shaping material 88 (FIG. 3) of a powder to a shaping vessel 12, and coats the shaping material 88 with a binding agent (a binder) binding the shaping material 88, thereby manufacturing a three-dimensional shaped object. Specifically, the three-dimensional shaping device 10 forms a powder layer 80 (FIG. 2) of a certain thickness in an upper portion of the shaping vessel 12, and coats this powder layer 80 with the binder to bind the powder, thereby forming a single shaped layer. The three-dimensional shaping device 10 repeats the above-described formation of the powder layer 80 and coating with the binder to laminate the shaped layers, and thereby form one shaped object.

Hereafter, an example where the three-dimensional shaping device 10 manufactures as the shaped object a sand mold (a core) for casting, will mainly be described. Note that the shaped object of the three-dimensional shaping device 10 is not limited to a mold for casting.

In the case of manufacturing a sand mold for casting, the likes of silica sand, alumina sand, zircon sand, chromite sand, olivine sand, and mullite sand, for example, may be cited as the shaping material 88. Moreover, in addition to these, slag-based particles of the likes of ferrochrome-based slag, ferronickel-based slag, and converter slag can be employed. Moreover, in the case of shaping another shaped object, gypsum particles, starch particles, and particles of various kinds of resins, and so on, can be used.

The binder with which the shaping material 88 is to be coated is appropriately selected according to the shaping material 88. To handle the above-described shaping material 88 employed in the mold for casting, there may be cited the likes of an organic material such as a phenol-based resin and a furan resin, and a water-soluble inorganic compound such as a clay, cement, and water glass, for example. The binder may include a catalyst promoting a hardening reaction of the shaping material 88 itself.

The three-dimensional shaping device 10 has: a base 14; a plurality of frames 16 extending upwardly coupled to the base 14; and a deck 18 that supports the shaping vessel 12. A drive mechanism 20 for driving the shaping vessel 12 is provided between the base 14 and the deck 18. The shaping vessel 12 is disposed on the deck 18. Moreover, a supply device 22 for supplying the shaping material 88, and a coating device 24 for coating with the binder, are provided above the shaping vessel 12.

The supply device 22 comprises a hopper 26, a circle feeder 28, a connecting portion 30, a chute 32, and a leveling plate 34. The hopper 26, which is a funnel-shaped member provided in an upper end portion of the supply device 22, houses on its inside the shaping material 88 configured by the powder. A bottom portion of the hopper 26 is provided with an opening, and the opening is connected with the circle feeder 28. An inside of a cylindrically-shaped main body of the circle feeder 28 is provided with: an inner rotor formed with radially-extending blades; and an outer rotor comprising blades that circle an outer periphery of the inner rotor. By the inner rotor and the outer rotor of the circle feeder 28 rotating, the circle feeder 28 delivers at a desired flow rate to the connecting portion 30 the shaping material 88 flowing in from a lower portion of the hopper 26.

The connecting portion 30, which is a rectangular tube-like member connected between an outlet of the circle feeder 28 and the chute 32, extends in a vertical direction. A lower end of the connecting portion 30 is connected with the chute 32.

As shown in FIG. 3, the chute 32 is a tube-like channel member having a discharge port 32a formed in its lower end. A channel 32c of rectangular shape elongated in a certain direction in planar view is formed inside the chute 32. Note that although FIG. 3 shows a state where, for convenience of explanation, the chute 32 has been cut at its lower part, in reality, as shown in FIG. 1, the connecting portion 30 is connected to an upper side of the chute 32. The chute 32 is formed in a shape of a taper whose width (length in a short side direction) gradually narrows from an upper end side to a lower end side of the chute 32. The shaping material 88 that has dropped down from the circle feeder 28 is stored to a certain height on a lower side of the chute 32. The chute 32 has a powder sensor 36 installed on its side, and the shaping material 88 is supplied from the circle feeder 28 in such a manner that an upper end position of the stored shaping material 88 maintains a position of the powder sensor 36.

The discharge port 32a in a lower portion of the chute 32 is disposed facing a shaping surface 12a appearing at an upper end of the shaping vessel 12. A length in a longitudinal direction of the discharge port 32a is formed smaller than a radius of the shaping vessel 12. The discharge port 32a is disposed with an orientation that its longitudinal direction is matched to a radial direction of the shaping vessel 12. That is, the chute 32 supplies the shaping material 88 to a rectangular region lying along the radial direction.

The leveling plate 34, which is a plate-like member disposed facing an inclined surface 32b of the chute 32, is fixed to the inclined surface 32b by a method such as bolting, for example. The leveling plate 34 is disposed, at a certain interval, further on a downstream side in a rotating direction of the shaping vessel 12 than the chute 32 is. The leveling plate 34 is formed with the same length as the length in the longitudinal direction of the discharge port 32a, and a lower end side 34a of the leveling plate 34 flatly levels the powder of the shaping material 88 that has been discharged from the discharge port 32a of the chute 32 of the shaping vessel 12, and thereby forms the powder layer 80.

On the other hand, the coating device 24 comprises: a coating head 38 of long length extending in the radial direction of the shaping vessel 12; and a piping 38a that supplies the coating head 38 with the binder, a drive current, and so on. The coating head 38, which is provided with numerous nozzles on a surface thereof facing the shaping surface 12a at the upper end of the shaping vessel 12, discharges droplets of the binder from the nozzles toward the powder layer 80. The coating head 38 is supplied with electric power and the binder via the piping 38a. The coating device 24, which is fixed to the frame 16 via a stay 38b, is provided in a non-rotating portion.

Next, the shaping vessel 12 and its drive mechanism 20 will be described.

As shown in FIG. 3, the shaping vessel 12 is disposed on the deck 18. The shaping vessel 12, which is a cylindrical vessel, is formed able to rotate around its axis. As shown in FIG. 2, the shaping vessel 12 has: an outer peripheral wall 40 configuring a side portion of the shaping vessel 12; and a shaping stand 42 configuring a bottom portion of the shaping vessel 12. The outer peripheral wall 40 has at its upper end a flange portion 40a extending out to an outer peripheral side, and, on its lower end side, comprises a bottom surface portion 40b extending toward a center of the shaping vessel 12, the bottom surface portion 40b having formed on an inner peripheral side thereof a through-hole 40c.

The bottom surface portion 40b of the outer peripheral wall 40 abuts on a guiding member 44. The guiding member 44 is disposed between the deck 18 and the bottom surface portion 40b, and comprises a freely rotating roller 44a. The guiding member 44 is configured in such a manner that by its roller 44a abutting on the bottom surface portion 40b, it guides rotation in a circumferential direction of the outer peripheral wall 40, and prevents looseness (inclination) of the shaping vessel 12.

The outer peripheral wall 40 has joined thereto at close to a center of its bottom surface portion 40b an outer peripheral wall rotating shaft 46. The outer peripheral wall 40 is supported in an axially rotatable manner by the outer peripheral wall rotating shaft 46. Moreover, a shaping stand rotating shaft 48 of the shaping stand 42 is disposed in a penetrating manner in the through-hole 40c of the outer peripheral wall 40.

The shaping stand 42, which is a plate-like member fitted to an inner side of the outer peripheral wall 40, is formed in substantially the same shape as an inner peripheral surface 40d of the outer peripheral wall 40. The shaping stand 42 configures the bottom portion of the shaping vessel 12. The shaping material 88 is supplied on top of the shaping stand 42, and the powder layer 80 and shaped layers are progressively laminated on top of the shaping stand 42. The shaping stand rotating shaft 48 is joined to the shaping stand 42 at a center of a lower end of the shaping stand 42. The shaping stand 42 is supported in a rotatable manner by the shaping stand rotating shaft 48.

The drive mechanism 20 comprises: the outer peripheral wall rotating shaft 46; the shaping stand rotating shaft 48; a rotation mechanism 50; a synchronous rotation mechanism 52 that synchronizes rotation of the outer peripheral wall rotating shaft 46 and the shaping stand rotating shaft 48; and a raising/lowering device 54 that raises/lowers the shaping stand 42.

The outer peripheral wall rotating shaft 46, which is joined to the bottom surface portion 40b of the outer peripheral wall 40, supports and axially rotates the outer peripheral wall 40. The outer peripheral wall rotating shaft 46, which is formed in a cylindrical shape extending cylindrically in an axial direction, has formed in its central portion a shaft hole 46a penetrating in the axial direction. The shaft hole 46a has the shaping stand rotating shaft 48 inserted therein. A lower end portion 46b of the outer peripheral wall rotating shaft 46 abuts on a supporting member 56 via a first bearing portion 47. The supporting member 56 is fixed to the deck 18 and the frame 16. The rotation mechanism 50 is provided at a side of the outer peripheral wall rotating shaft 46.

The rotation mechanism 50 is configured by a motor, and has its drive shaft 50a connected to the outer peripheral wall rotating shaft 46 via a belt 60. The belt 60, which is bridged over the drive shaft 50a and an outer peripheral portion of the outer peripheral wall rotating shaft 46, transmits a driving force of the drive mechanism 50 to the outer peripheral wall rotating shaft 46, and thereby rotates the outer peripheral wall rotating shaft 46.

The shaping stand rotating shaft 48, which is a circular column-like member extending in the axial direction, has its upper end connected to the shaping stand 42, and has its lower end connected to the raising/lowering device 54. The shaping stand rotating shaft 48 is connected to the raising/lowering device 54 via a second bearing portion 58, and rotational movement of the shaping stand rotating shaft 48 is configured not to be transmitted to the raising/lowering device 54.

The synchronous rotation mechanism 52 is provided to the shaft hole 46a being an abutting portion of the outer peripheral wall rotating shaft 46 and the shaping stand rotating shaft 48. The synchronous rotation mechanism 52 comprises: a raising/lowering groove 62 provided in an outer peripheral portion of the shaping stand rotating shaft 48; and a sliding projection 64 projecting inwardly from the outer peripheral wall rotating shaft 46 to be inserted in the raising/lowering groove 62. One or a plurality of the raising/lowering grooves 62, each of which is formed as a groove extending in the axial direction of the shaping stand rotating shaft 48, are provided in the outer peripheral portion of the shaping stand rotating shaft 48. In the example of FIG. 2, two raising/lowering grooves 62 are provided separated by 180° in a circumferential direction.

The sliding projection 64, which is formed in a size enabling it to be inserted in the raising/lowering groove 62, is configured capable of sliding in an axial direction along an inside of the raising/lowering groove 62, along the raising/lowering groove 62. The sliding projection 64, which is formed integrally with the outer peripheral wall rotating shaft 46, engages with the raising/lowering groove 62 to prevent relative rotation of the shaping stand rotating shaft 48 and the outer peripheral wall rotating shaft 46.

The raising/lowering device 54, which comprises: a motor 54*a*; and a ball screw mechanism 54*b* driven by that motor 54*a*, raises/lowers a shaft 54*c*. The raising/lowering device 54 raises/lowers the shaping stand rotating shaft 48 through the shaft 54*c*.

The three-dimensional shaping device 10 of the present embodiment, which is configured as above, will have its action described below along with the method of shaping.

The three-dimensional shaping device 10 shown in FIG. 1 performs a shaping operation, while rotating the shaping vessel 12 at a constant speed, by the drive mechanism 20. As shown in FIG. 2, the drive mechanism 20 applies a rotational force to the outer peripheral wall rotating shaft 46 through the rotation mechanism 50. As a result, the outer peripheral wall 40 rotates integrally with the outer peripheral wall rotating shaft 46. Moreover, rotational movement of the outer peripheral wall rotating shaft 46 is transmitted to the shaping stand rotating shaft 48 via the sliding projection 64 and the raising/lowering groove 62 configuring the synchronous rotation mechanism 52. Thus, the shaping stand rotating shaft 48 rotates along with the outer peripheral wall rotating shaft 46, and the shaping stand 42 supported by the shaping stand rotating shaft 48 rotates. As a result, the outer peripheral wall 40 and the shaping stand 42 rotate at the same angular speed.

After rotational speed of the shaping vessel 12 has settled at a constant speed, the supply device 22 starts to supply powder of the shaping material 88. The shaping material 88 of the hopper 26 of the supply device 22 of FIG. 1 is delivered to the connecting portion 30 through the circle feeder 28. The shaping material 88 that has been delivered to the connecting portion 30 drops down toward the chute 32. Then, while the shaping material 88 that has dropped down is stored in the chute 32 to the position of the powder sensor 36, some of it is discharged from the discharge port 32*a* at the lower end of the chute 32.

As shown in FIG. 3, the shaping material 88 that has been discharged from the chute 32 accumulates on top of the shaping stand 42, and, with rotational movement of the shaping stand 42, moves to a downstream side in the rotating direction. Then, the shaping material 88 is flatly leveled by the leveling plate 34 to form the flat powder layer 80. The powder layer 80 passes below the coating device 24, due to rotational movement of the shaping stand 42. The coating device 24 discharges the binder at a certain position of the powder layer 80, and thereby forms a desired shaped pattern (a slice or shaped layer).

Subsequently, the drive mechanism 20 performs a lowering operation displacing the shaping stand 42 downwards by a constant height, every time the shaping stand 42 makes one rotation. In the lowering operation of the shaping stand 42, the raising/lowering device 54 of FIG. 2 draws in the shaft 54*c* downwardly. Due to drawing-in of the shaft 54*c*, the shaping stand rotating shaft 48 is displaced downwards via the second bearing portion 58. At that time, the sliding projection 64 slides along the raising/lowering groove 62, so displacement downwards of the shaping stand rotating shaft 48 is not prevented by the synchronous rotation mechanism 52. The shaping stand 42 ascends/descends along with the shaping stand rotating shaft 48.

Even during the lowering operation of the shaping stand 42, the shaping stand 42 and the outer peripheral wall 40 continue their rotation at a constant speed. Moreover, supply of the shaping material 88 is performed at a constant flow rate from the chute 32, and the powder layer 80 whose shaping has been completed has a new powder layer 80 formed on top thereof. Moreover, coating with the binder by the coating device 24 is simultaneously performed.

The three-dimensional shaping device 10 repeats formation of the powder layer 80 and shaping of the shaped layer while rotating the shaping vessel 12 at 20 to 60 rpm, for example. Since the shaping vessel 12 does not stop in an interval of the shaping operation, wasteful waiting time can be eliminated, and mass productivity is excellent.

Figure 4A:
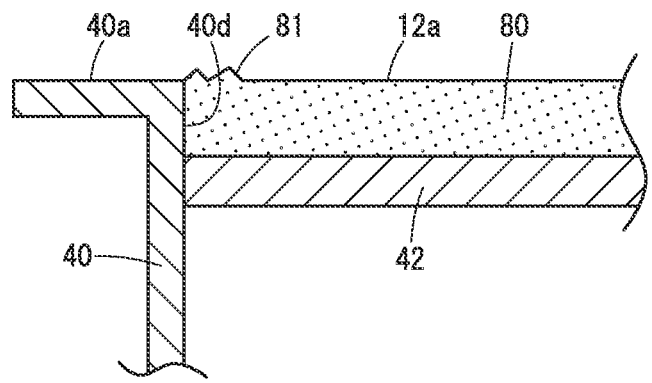
FIG. 4A is a cross-sectional view showing a powder layer of a three-dimensional shaping device according to a comparative example.

As shown in a comparative example of FIG. 4A, when rotational speeds (angular speeds) of the shaping stand 42 and the outer peripheral wall 40 differ, the powder layer 80 formed on top of the shaping stand 42 is unstable due to receiving a resistance force from friction with the outer peripheral wall 40, and has an unevenness 81 formed on its surface.

Figure 4B:
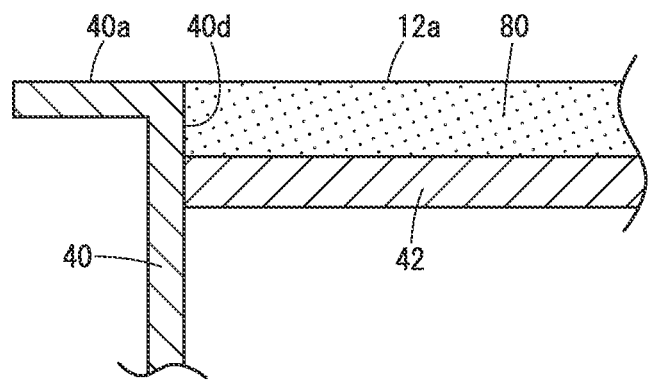
FIG. 4B is a cross-sectional view showing a powder layer in the three-dimensional shaping device of FIG. 1.

To counter this, in the three-dimensional shaping device 10 of the present embodiment, the shaping stand 42 and the outer peripheral wall 40 rotate at the same angular speed, hence the powder layer 80 on top of the shaping stand 42 can be formed flatly as shown in FIG. 4B.

The three-dimensional shaping device 10 of the present embodiment displays the following advantages.

The three-dimensional shaping device 10 in the viewpoint described above comprises: the shaping vessel 12 having the outer peripheral wall 40 and the shaping stand 42, the shaping stand 42 configuring the bottom portion of the shaping vessel 12; the rotation mechanism 50 that rotates the shaping stand 42; and the raising/lowering device 54 that raises/lowers the shaping stand 42 inside the outer peripheral wall 40, wherein the outer peripheral wall 40 and the shaping stand 42 are connected via the synchronous rotation mechanism 52 that, while restricting relative movement in the circumferential direction with respect to each other of the outer peripheral wall 40 and the shaping stand 42, enables their relative movement in the axial direction.

Due to the above-described configuration, in the shaping vessel 12, the outer peripheral wall 40 and the shaping stand 42 are rotated at the same speed (angular speed), hence even when rotational speed of the shaping vessel 12 has been increased several tens of rpm, a stable powder layer 80 can be formed.

Moreover, it becomes possible for the supply device 22 and the coating device 24 to be provided in a non-rotating region, hence there is no need for the likes of piping for material supply or power supply wiring to be provided in a rotating region, and device configuration can be simplified. Since replenishment with the shaping material 88 of the supply device 22 and replenishment with the binder of the coating device 24 are easy, a large-sized shaped article too can be easily handled.

Furthermore, since the rotating portion is the shaping vessel 12 alone, the rotating portion is weight-lightened, hence improvement in rotational speed is easy, and suitable use is possible in mass-produced articles too.

In the above-described three-dimensional shaping device 10, the synchronous rotation mechanism 52 may have: the raising/lowering groove 62 that is provided on either one of a shaping stand 42 and an outer peripheral wall 40, and that extends in the axial direction; and the sliding projection 64 that is provided on the other of the shaping stand 42 and the outer peripheral wall 40, and that, while engaging with the raising/lowering groove 62 to prevent relative rotation of the shaping stand 42 and the outer peripheral wall 40, is capable of sliding in the axial direction along the raising/lowering groove 62.

Due to the above-described configuration, the outer peripheral wall 40 and the shaping stand 42 can be rotated at the same speed by a simple device configuration. Moreover, the outer peripheral wall 40 and the shaping stand 42 can be rotated by a common rotation mechanism 50.

In the above-described three-dimensional shaping device 10, there may be provided: the shaping stand rotating shaft 48 that supports the shaping stand 42; and the outer peripheral wall rotating shaft 46 that supports the outer peripheral wall 40 and has a shaft hole 46a through which the shaping stand rotating shaft 48 is inserted, wherein the raising/lowering groove 62 may be provided in the shaping stand rotating shaft 48, and the sliding projection 64 may be provided in the outer peripheral wall rotating shaft 46. Due to this configuration, the synchronous rotation mechanism 52 can be provided in a portion not sneaked into by powder of the shaping material 88, hence reliability is excellent.

In the above-described three-dimensional shaping device 10, the raising/lowering device 54 may be connected to the shaping stand rotating shaft 48 via the second bearing portion 58. As a result, the raising/lowering device 54 can be provided in a non-rotating portion, hence device configuration can be simplified.

In the above-described three-dimensional shaping device 10, the lower end of the outer peripheral wall 40 may be provided with the guiding member 44 that guides rotation of the outer peripheral wall 40. Due to this configuration, inclination or looseness of the outer peripheral wall 40 are prevented, so that a stable powder layer 80 can be formed in the shaping vessel 12.

The method of shaping of the present embodiment is a method of shaping employing the three-dimensional shaping device 10, the three-dimensional shaping device 10 comprising: the shaping vessel 12 having the outer peripheral wall 40 and the shaping stand 42, the shaping stand 42 configuring the bottom portion of the shaping vessel 12; the rotation mechanism 50 that rotates the shaping vessel 12; the raising/lowering device 54 that raises/lowers the shaping stand 42 with respect to the outer peripheral wall 40; the chute 32 that is disposed above the shaping stand 42, and that supplies powder of the shaping material 88 to the shaping vessel 12; the leveling plate 34 that levels into a flat powder layer 80 the powder that has been supplied from the chute 32; and the coating device 24 that coats the powder layer 80 with the binder, wherein, in the method, while the outer peripheral wall 40 and the shaping stand 42 are being continuously rotated at the same angular speed by the rotation mechanism 50, the powder layer 80 is formed by the chute 32 and the leveling plate 34, coating with the binder is performed by the coating device 24, and, every time the shaping vessel 12 makes one rotation, the shaping stand 42 is lowered by the raising/lowering device 54 for a new powder layer 80 to be formed. Due to this method of shaping, shaping of the shaped object can be quickly performed.

Second Embodiment

As shown in FIG. 5, a three-dimensional shaping device 10A of the present embodiment differs from the three-dimensional shaping device 10 described with reference to FIGS. 1 to 3 regarding its drive mechanism 20A. In the following, description will be made focusing on the drive mechanism 20A, and descriptions of the supply device 22 and the coating device 24 will be omitted. Moreover, in the three-dimensional shaping device 10A of FIG. 5, configurations the same as in the three-dimensional shaping device 10 of FIG. 2 will be assigned with the same reference symbols as in FIG. 2, and detailed descriptions thereof will be omitted.

The drive mechanism 20A shown in FIG. 5 has a structure in which the shaping stand rotating shaft 48 supporting the shaping stand 42 has transmitted thereto rotational force of the rotation mechanism 50. The shaping stand rotating shaft 48 has rotational force of the drive shaft 50a of the rotation mechanism 50 transmitted thereto via the belt 60. The shaping stand rotating shaft 48 is connected to the raising/lowering device 54 via the second bearing portion 58.

In a shaping vessel 12A, the bottom surface portion 40b of an outer peripheral wall 40A extends to an inner peripheral side to configure an outer peripheral wall rotating shaft 46A that abuts on an outer peripheral surface of the shaping stand rotating shaft 48. Moreover, a synchronous rotation mechanism 52A of the present embodiment is provided in an abutting portion of the outer peripheral wall rotating shaft 46A and the shaping stand rotating shaft 48. The synchronous rotation mechanism 52A comprises: a raising/lowering groove 62A extending in the axial direction, provided in an outer periphery of the shaping stand rotating shaft 48; and a sliding projection 64A projecting from the outer peripheral wall rotating shaft 46A. The sliding projection 64A is inserted in the raising/lowering groove 62A to prevent the outer peripheral wall 40A and the shaping stand rotating shaft 48 from rotating relatively to each other. When a raising/lowering operation of the shaping stand rotating shaft 48 is performed, the sliding projection 64A slides along the raising/lowering groove 62A, and is thereby kept in a state of engagement with the raising/lowering groove 62A.

As indicated above, the drive mechanism 20A of the three-dimensional shaping device 10A of the present embodiment has a configuration in which rotational force is transmitted to the shaping vessel 12A via the shaping stand rotating shaft 48. The three-dimensional shaping device 10A of the present embodiment too enables similar advantages to those of the three-dimensional shaping device 10 of the first embodiment to be obtained.

Third Embodiment

Figure 6:
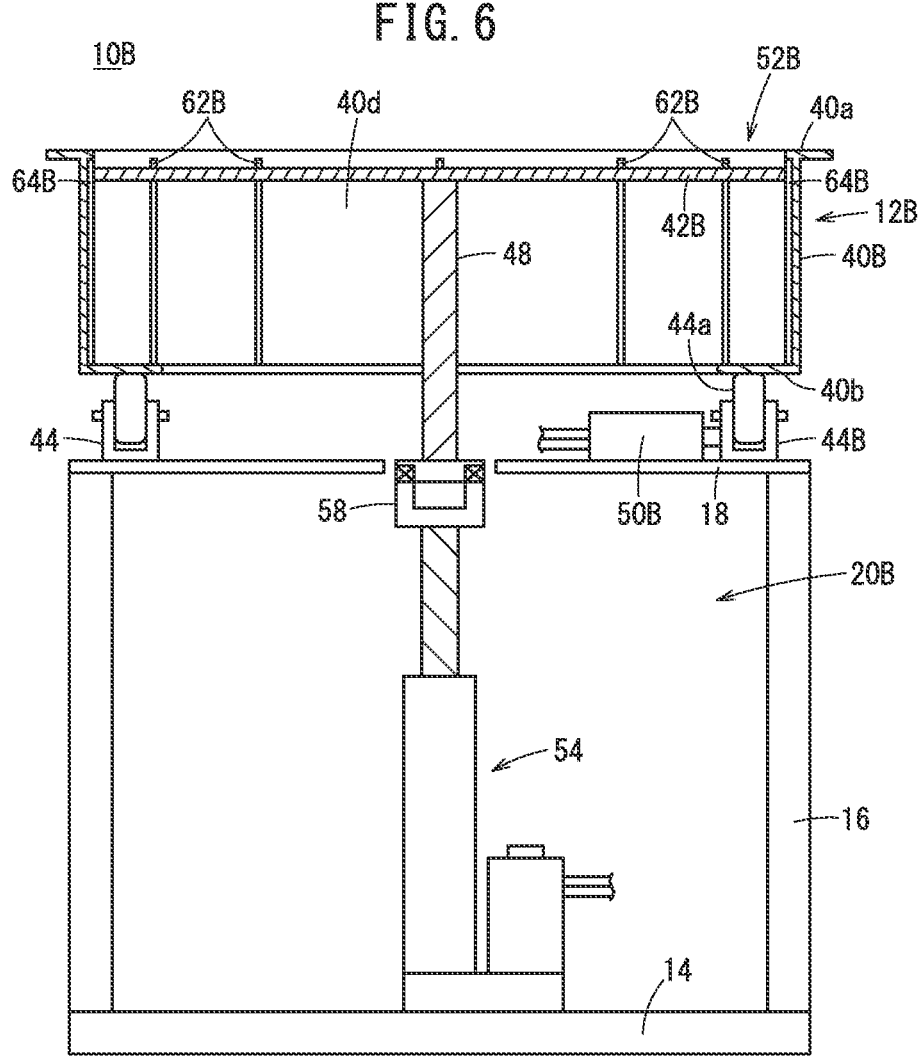
FIG. 6 is a cross-sectional view of a shaping vessel and a drive mechanism of a three-dimensional shaping device according to a third embodiment.

As shown in FIG. 6, a three-dimensional shaping device 10B of the present embodiment differs from the three-dimensional shaping device 10 described with reference to FIGS. 1 to 3 regarding its drive mechanism 20B. In the following, description will be made focusing on the drive mechanism 20B, and descriptions of the supply device 22 and the coating device 24 will be omitted. Moreover, in the three-dimensional shaping device 10B of FIG. 6, configurations the same as in the three-dimensional shaping device 10 of FIG. 2 will be assigned with the same reference symbols as in FIG. 2, and detailed descriptions thereof will be omitted.

In the drive mechanism 20B shown in FIG. 6, the shaping stand rotating shaft 48 supporting a shaping stand 42B does not have the rotation mechanism 50 connected thereto, and a lower end of the shaping stand rotating shaft 48 is connected to the raising/lowering device 54 via the second bearing portion 58.

On the other hand, an outer peripheral wall 40B of a shaping vessel 12B is supported by the guiding member 44 and a guiding member 44B. The guiding member 44B has connected thereto a rotation mechanism 50B, and the rotation mechanism 50B rotates the outer peripheral wall 40B through the guiding member 44B.

A synchronous rotation mechanism 52B of the present embodiment is provided to the inner peripheral surface 40d of the outer peripheral wall 40B and to an outer peripheral portion of the shaping stand 42B. That is, the synchronous rotation mechanism 52B comprises: a raising/lowering groove 62B extending in the axial direction, provided in the inner peripheral surface 40d; and a sliding projection 64B provided in the outer peripheral portion of the shaping stand 42B. The sliding projection 64B engages with the raising/lowering groove 62B to rotate the shaping stand 42B at the same speed as the outer peripheral wall 40B. Moreover, by the sliding projection 64B sliding in the axial direction along the raising/lowering groove 62B, a raising/lowering operation of the shaping stand 42B is enabled.

In the three-dimensional shaping device 10B of the present embodiment configured as above, the synchronous rotation mechanism 52B is provided to the inner peripheral surface 40d of the outer peripheral wall 40B and to the outer peripheral portion of the shaping stand 42B. The three-dimensional shaping device 10B of the present embodiment too enables similar advantages to those of the three-dimensional shaping device 10 of the first embodiment to be obtained.

Fourth Embodiment

Figure 7:
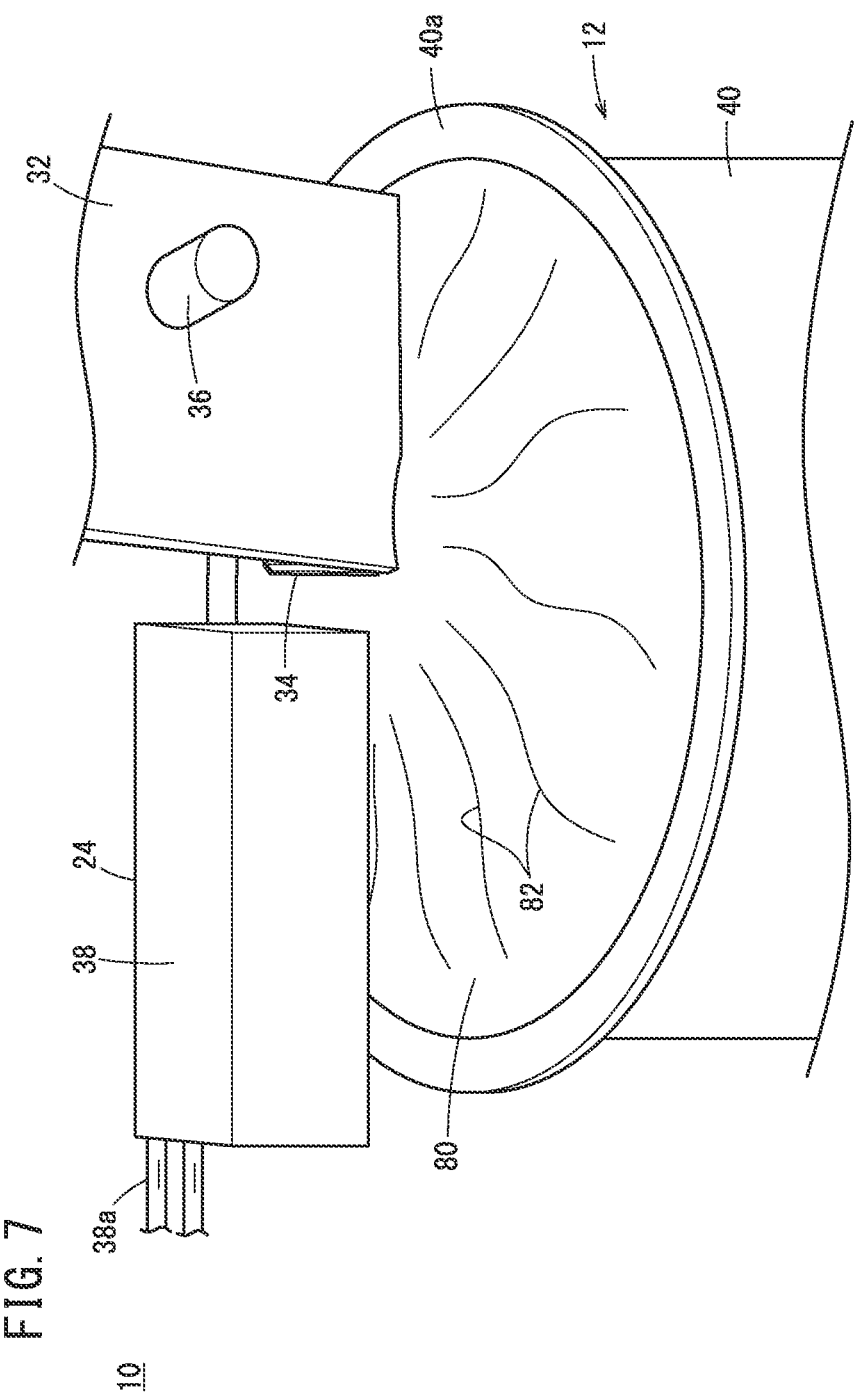
FIG. 7 is a perspective view showing an example of occurrence of an unevenness of the powder layer in the three-dimensional shaping device of FIG. 1.

As shown in FIG. 7, in the three-dimensional shaping device 10 of the first embodiment, in the case of the powder layer 80 being formed while the shaping vessel 12 is being rotated at a constant rotational speed, it has become clear that, depending on conditions, an unevenness 82 like a surface of the powder layer 80 is undulating, will occur.

Figure 8:
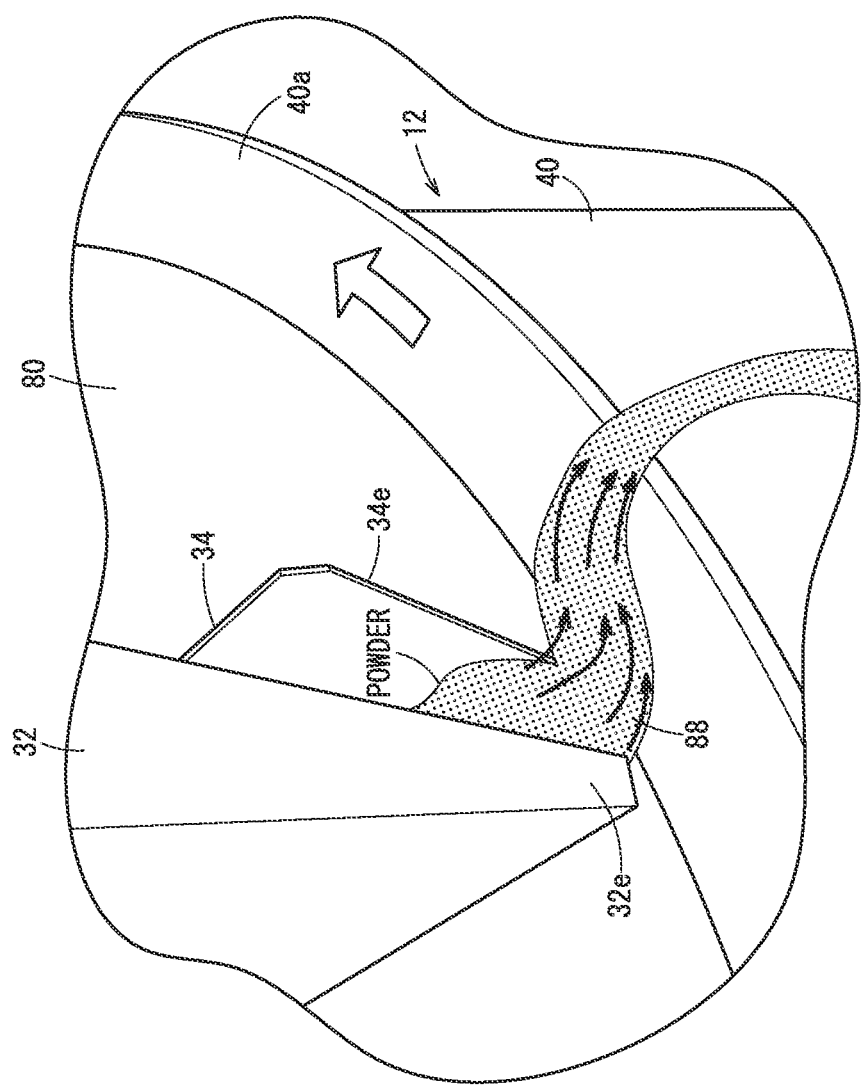
FIG. 8 is a perspective view showing a situation of the chute and a leveling plate during operation of the three-dimensional shaping device of FIG. 1.

As shown in FIG. 8, in the three-dimensional shaping device 10 of the first embodiment, a space between an outer peripheral end 32e of the chute 32 and an outer peripheral end 34e of the leveling plate 34 is open, and, at a time of formation of the powder layer 80, the powder layer 80 is formed while some of the shaping material 88 that has been leveled off by the leveling plate 34 flows out to an outer peripheral side.

As a result of investigations having been performed by the inventors of the present application, it has become clear that if a distance h2 (FIG. 9A) between the discharge port 32a of the chute 32 and the shaping surface 12a, and a distance h1 (FIG. 9A) between the lower end side 34a of the leveling plate 34 and the shaping surface 12a are of the same height, then sometimes a supply deficiency of the shaping material 88 will occur, whereby an unleveled-off portion will occur. In addition, it has become clear that friction will occur between the shaping material 88 and the rotating flange portion 40a of the outer peripheral wall 40 in a gap between the outer peripheral end 32e of the chute 32 and the outer peripheral end 34e of the leveling plate 34, and that, as a result of this friction occurring, the laminated powder layer 80 will undulate.

Figure 9A:
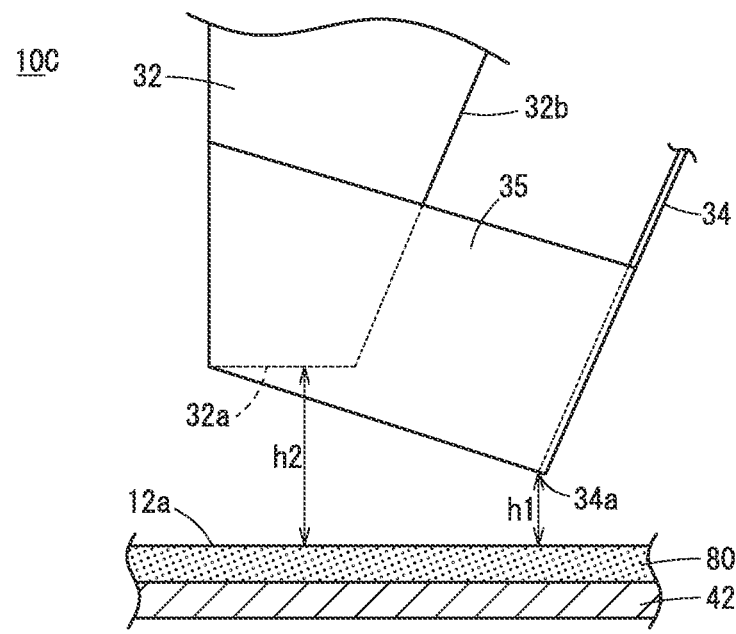
FIG. 9A is a side view of a chute and a leveling plate according to a fourth embodiment.

Accordingly, in a three-dimensional shaping device 10C of the present embodiment, as shown in FIG. 9A, the distance h2 between the shaping surface 12a and the discharge port 32a of the chute 32 is made larger than the distance h1 between the lower end side 34a of the leveling plate 34 and the shaping surface 12a. Although not specifically limited, the distance h2 can be set to about 3 mm, for example, and the distance h1 can be set to about 1 mm, for example. As a result, an amount of the shaping material 88 discharged from the chute 32 increases, hence occurrence of the unevenness 82 due to supply deficiency of the shaping material 88 can be prevented.

Figure 9B:
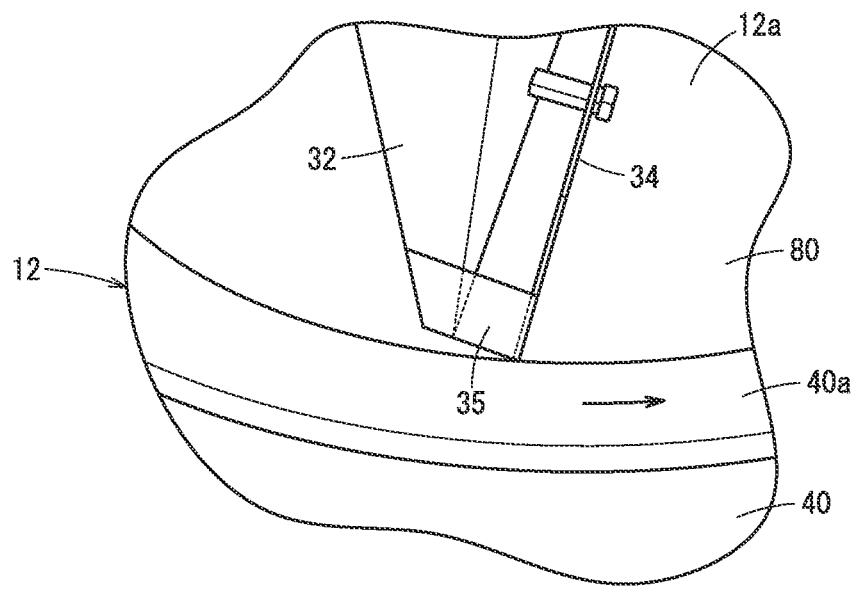
FIG. 9B is a perspective view of the chute and the leveling plate of FIG. 9A.

Moreover, there is provided a blocking wall 35 that seals the gap between the outer peripheral end 32e of the chute 32 and the outer peripheral end 34e of the leveling plate 34. As shown in FIG. 9B, the blocking wall 35 is positioned above an end portion on an inner peripheral side of the flange portion 40a of the outer peripheral wall 40. By providing such a blocking wall 35, the shaping material 88 between the chute 32 and the leveling plate 34 can be prevented from being discharged to the outer peripheral side, and frictional resistance between the shaping material 88 and the flange portion 40a can be suppressed.

As indicated above, the three-dimensional shaping device 10C of the present embodiment comprises: the shaping vessel 12 having the outer peripheral wall 40 and the shaping stand 42, the shaping stand 42 configuring the bottom portion of the shaping vessel 12; the rotation mechanism 50 (refer to FIG. 2) that rotates the shaping stand 42; the raising/lowering device 54 that raises/lowers the shaping stand 42; the chute 32 that is disposed above the shaping stand 42, and that delivers powder of the shaping material 88 to the shaping vessel 12; and the leveling plate 34 that is provided on a downstream side in the rotating direction of the chute 32, and that flatly levels the powder that has been delivered from the chute 32, wherein the lower end side 34a of the leveling plate 34 is disposed at a closer position to the shaping stand 42 than a lower end of the chute 32 is.

Due to the above-described configuration, the amount of the shaping material 88 discharged from the chute 32 increases, hence formation of the unevenness 82 due to a portion unleveled-off by the leveling plate 34 occurring as a result of supply deficiency of the shaping material 88, can be prevented.

In the above-described three-dimensional shaping device 10C, there may be provided the blocking wall 35 that blocks the gap between the outer peripheral end 32e of the chute 32 and the outer peripheral end 34e of the leveling plate 34. Thus, the shaping material 88 between the chute 32 and the leveling plate 34 can be prevented from being discharged to the outer peripheral side, and frictional resistance between the shaping material 88 and the flange portion 40a can be suppressed. As a result, occurrence of the unevenness 82 on the surface of the powder layer 80 can be prevented.

Fifth Embodiment

Figure 10A:
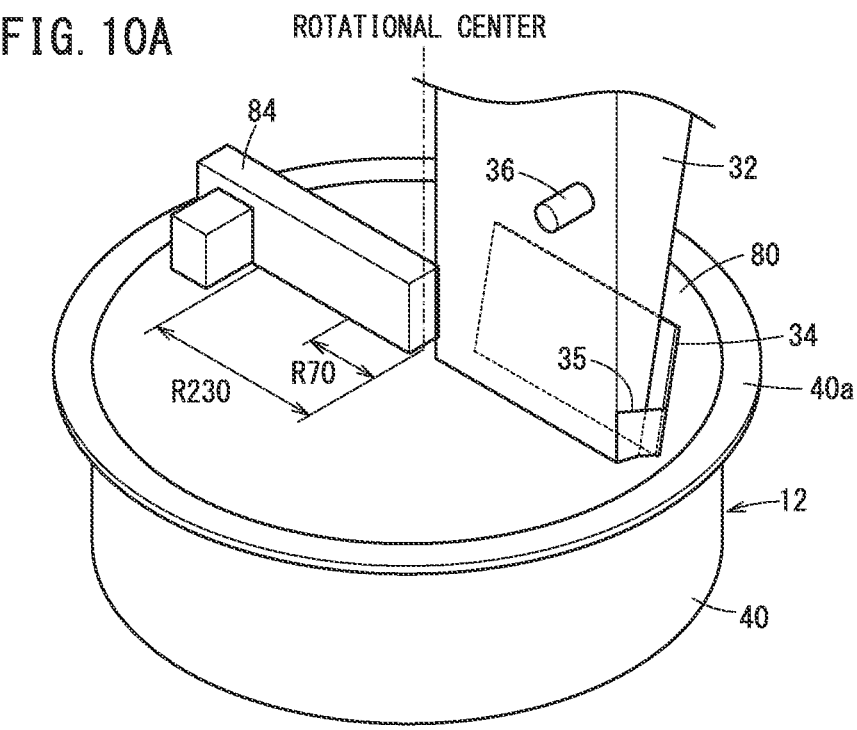
FIG. 10A is a perspective view of a testing device for flatness evaluation of a powder layer according to test example 1.

As shown in FIG. 10A, in test example 1, evaluation of flatness of the powder layer 80 formed by the supply device 22 was performed. In test example 1, while the shaping vessel 12 was being rotated at a constant speed, the shaping material 88 was supplied from the chute 32 and flatly leveled by the leveling plate 34 to form the powder layer 80. Arrangement of the leveling plate 34 and the chute 32 is assumed to be the same as in FIG. 9A. Evaluation of flatness was performed by employing a height measuring device 84 to measure height of the powder layer 80 at a position of 70 mm from a rotational center and a position of 230 mm from the rotational center.

Figure 10B:
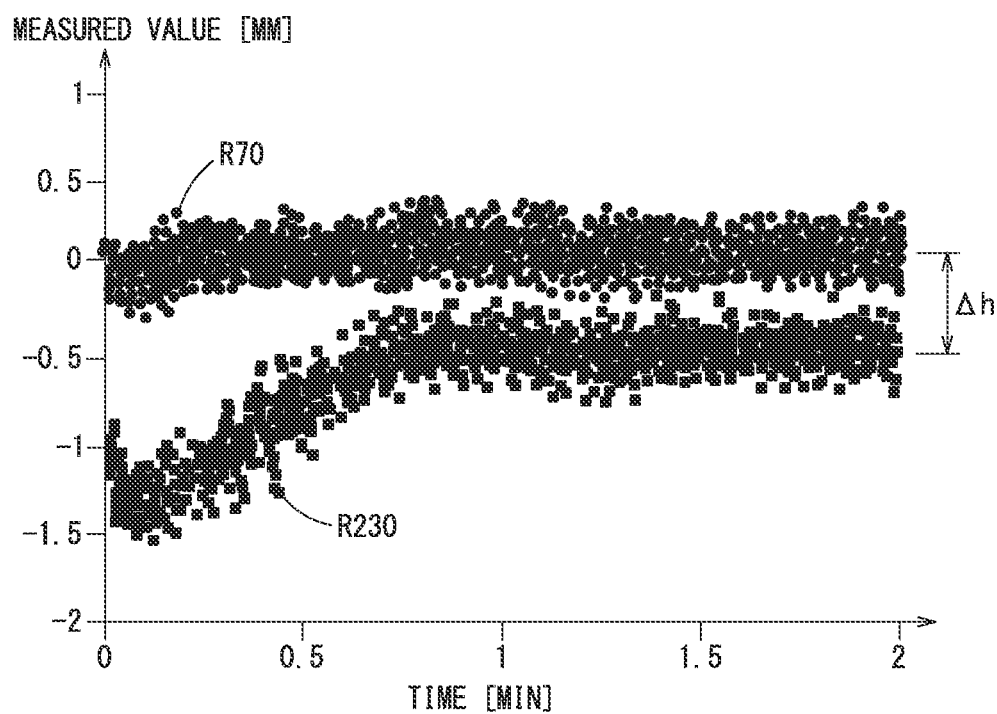
FIG. 10B is a graph showing measured results of height of the powder layer at positions of 70 mm and 230 mm from a rotational center of a shaping vessel of FIG. 10A.

FIG. 10B shows measured results. In FIG. 10B, time 0 min indicates a time when lowering of the shaping stand 42 of the shaping vessel 12 was stopped. R70 indicates change in height of the surface of the powder layer 80 at the position of 70 mm from the rotational center, and R230 indicates change in height of the surface of the powder layer 80 at the position of 230 mm from the rotational center. Although with passage of a certain time, the powder layer 80 settles at a constant height, there occurs a difference in height between the height (R70) of the powder layer 80 on an inner peripheral side and the height (R230) of the powder layer 80 on an outer peripheral side.

Figure 11A:
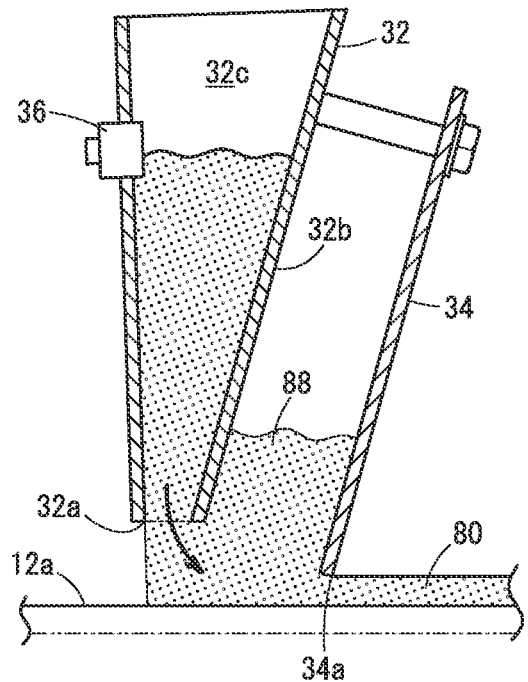
FIG. 11A is an explanatory diagram showing movement of powder supplied to a shaping surface from a chute, and leveled by a leveling plate.

As shown in FIG. 11A, in the chute 32, in which the shaping material 88 is stored to the position of the powder sensor 36, the shaping material 88 is discharged at a constant flow rate from the discharge port 32a. When the shaping material 88 that has been discharged onto the shaping surface 12a is leveled off by the leveling plate 34, some of said shaping material 88 accumulates in the gap between the leveling plate 34 and the chute 32. The shaping material 88 in a gap between the lower end side 34a of the leveling plate 34 and the shaping surface 12a is acted on by a pressure corresponding to height of the shaping material 88 that has accumulated in the gap between the leveling plate 34 and the chute 32, and this pressure acts to increase an amount of the shaping material 88 passing through the gap between the leveling plate 34 and the shaping surface 12a.

Figure 11B:
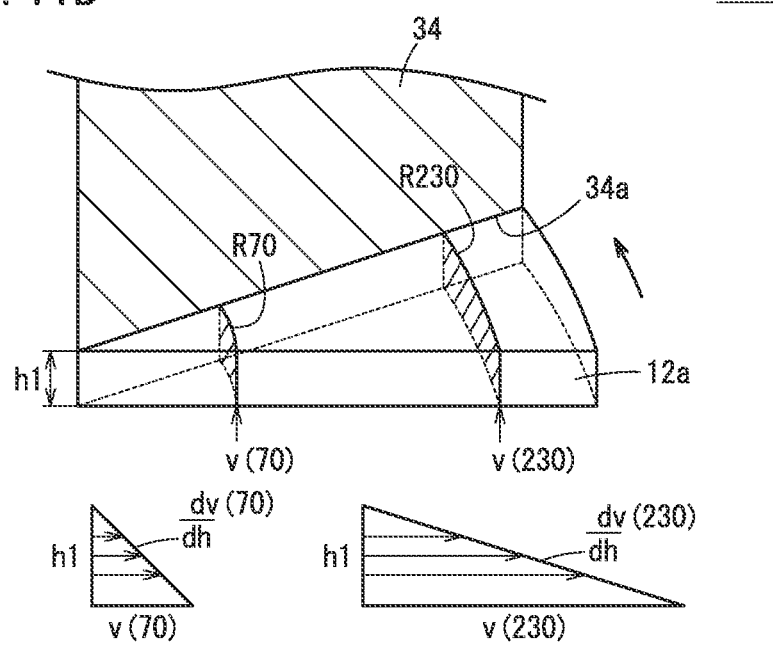
FIG. 11B is an explanatory diagram showing a speed gradient of a powder layer directly under the leveling plate.

Meanwhile, in the gap between the lower end side 34a of the leveling plate 34 and the shaping surface 12a, as shown in FIG. 11B, a speed gradient of the shaping material 88 occurs, and a pressure loss proportional to this speed gradient acts to negate the above-described pressure due to height of the shaping material 88 that has accumulated in the gap between the leveling plate 34 and the chute 32.

As illustrated, linear speed of the shaping surface 12a is larger on the outer peripheral side than on the inner peripheral side, hence the speed gradient dv/dh will be larger on the outer peripheral side (dv/dh(230)) than on the inner peripheral side (dv/dh(70)). As a result, the more the outer peripheral side is approached, the more difficult it becomes for the shaping material 88 to pass through the gap between the lower end side 34a of the leveling plate 34 and the shaping surface 12a. As a result, the more the outer peripheral side is approached, the lower the height of the powder layer 80 becomes.

Figure 12A:
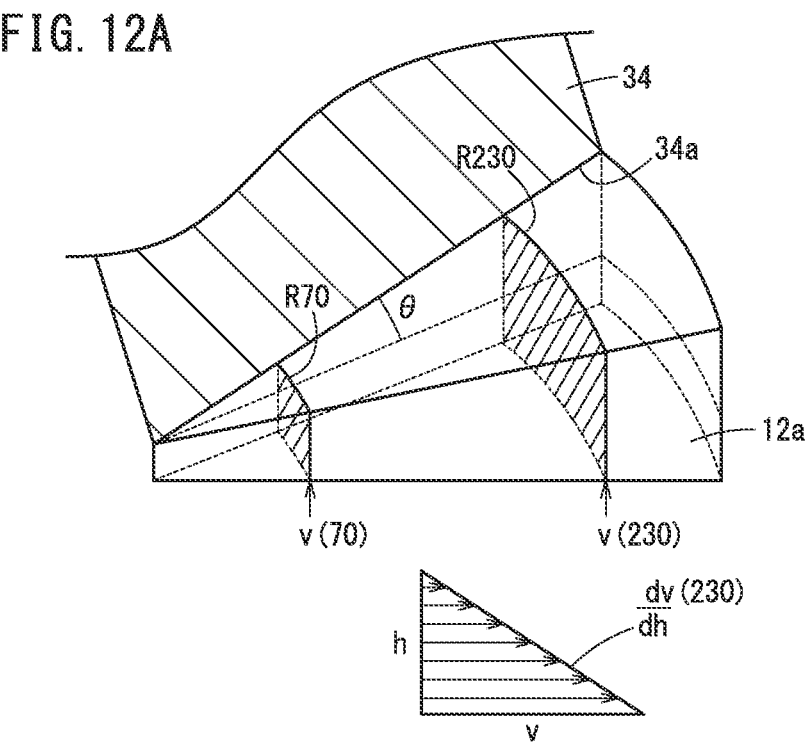
FIG. 12A is an explanatory diagram showing an arrangement example of a leveling plate according to a fifth embodiment, and a speed gradient of a powder layer directly under the leveling plate.

Accordingly, in the present embodiment, as shown in FIG. 12A, it has been decided to incline the lower end side 34a of the leveling plate 34 in such a manner that the more the outer peripheral side is approached from the inner peripheral side, the more a separation distance from the shaping surface 12a increases. By configuring in this way, the more the outer peripheral side is approached, the more the gap between the lower end side 34a of the leveling plate 34 and the shaping surface 12a increases. As a result, increase in the speed gradient dv/dh of the shaping material 88 in the gap between the lower end side 34a of the leveling plate 34 and the shaping surface 12a can be suppressed, and effects of pressure loss can be reduced. Moreover, expansion of a channel due to widening of the gap between the lower end side 34a of the leveling plate 34 and the shaping surface 12a results in there also being obtained an advantage that passage flow rate of the shaping material 88 increases.

Figure 12B:
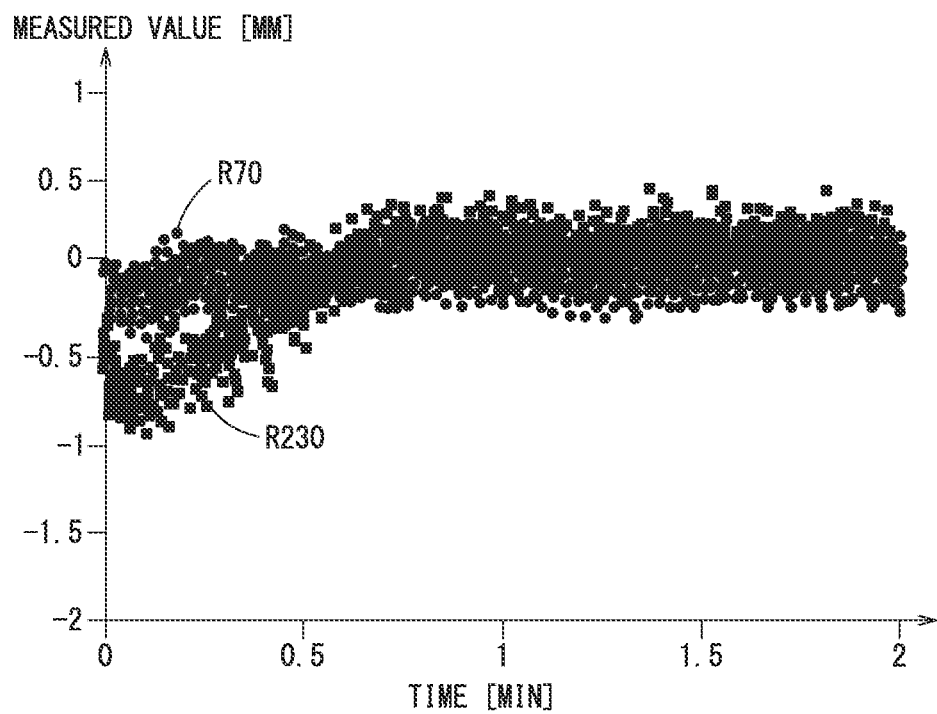
FIG. 12B is a graph showing measured results of height of the powder layer according to test example 2 (the fifth embodiment)

FIG. 12B shows measured results of test example 2 (the present embodiment) in which the leveling plate 34 that has had its lower end side 34a inclined is employed. As illustrated, heights of the powder layer 80 are substantially the same on the inner peripheral side (R70) and the outer peripheral side (R230), and it can be confirmed that flatness of the powder layer 80 improves.

Sixth Embodiment

Figure 13:
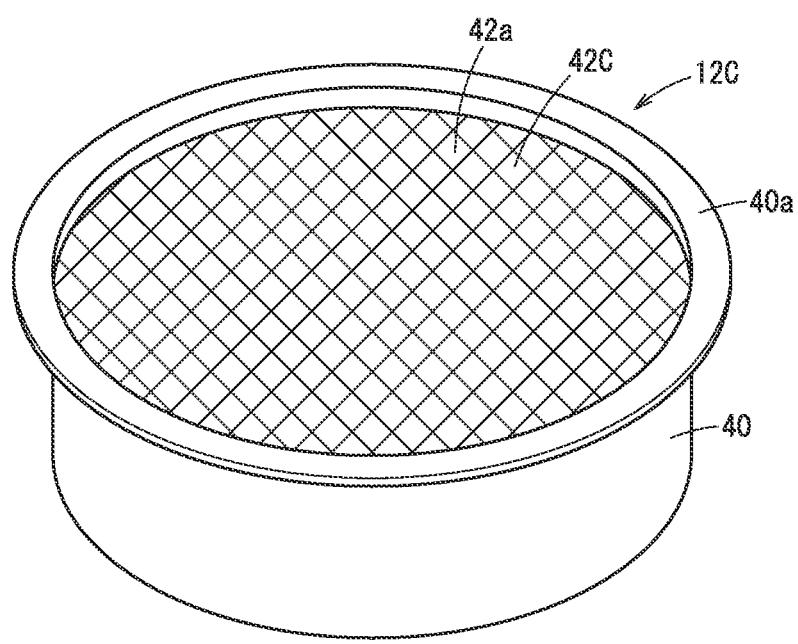
FIG. 13 is a perspective view of a shaping stand according to a sixth embodiment.

In the present embodiment, as shown in FIG. 13, a surface of a shaping stand 42C is configured by a friction surface 42a whose friction with respect to the powder is high. The friction surface 42a can be configured by the likes of a knurling-processed surface having fine grooves formed in a lattice shape therein, for example.

In the configuration for rotating the shaping vessel 12, if the shaping stand 42 is configured by a smooth surface, then when supply of powder has begun to start, the powder will end up slipping on the surface of the shaping stand 42, and time will end up being required until the powder stabilizes and the powder layer 80 is thereby formed.

In contrast, in the present embodiment, due to the surface of the shaping stand 42C being configured by the friction surface 42a, the shaping material 88 quickly establishes itself on the shaping stand 42C, so that the powder layer 80 can be quickly formed, and a waiting time for a starting time of the three-dimensional shaping device 10 can be reduced.

Preferred embodiments of the present invention have been presented and described above. However, the present invention is not limited to the above-described embodiments, and it goes without saying that a variety of modifications thereof are possible in a range not departing from the spirit of the present invention.

What is claimed is:

1. A three-dimensional shaping device comprising:
   a shaping vessel that has an outer peripheral wall and a shaping stand, the shaping stand configuring a bottom portion of the shaping vessel;
   a rotation mechanism that rotates the shaping stand and the outer peripheral wall at a same angular speed;
   a raising and lowering device that raises and lowers the shaping stand inside the outer peripheral wall;
   a chute that is disposed above the shaping stand and that delivers powder of a shaping material to the shaping vessel;
   a leveling plate that is provided on a downstream side in a rotating direction of the chute, and that flatly levels the powder that has been delivered from the chute; and
   a blocking wall that blocks a gap between an outer peripheral end of the chute and an outer peripheral end of the leveling plate,
   wherein,
   a lower end of the leveling plate is disposed at a closer position to the shaping stand than a lower end of the chute is, and
   the blocking wall is positioned directly above an end portion on an inner peripheral side of the outer peripheral wall that rotates relative to the chute,
   wherein the outer peripheral wall and the shaping stand are connected via a synchronous rotation mechanism that, while restricting relative movement in a circumferential direction of the outer peripheral wall and the shaping stand with respect to each other, enables relative movement of the outer peripheral wall and the shaping stand in an axial direction.

2. The three-dimensional shaping device according to claim 1, wherein the synchronous rotation mechanism has:
   a raising and lowering groove that is provided on either one of the shaping stand and the outer peripheral wall, and that extends in the axial direction; and
   a sliding projection that is provided on the other of the shaping stand and the outer peripheral wall, and that, while engaging with the raising and lowering groove to prevent relative rotation of the shaping stand and the outer peripheral wall, is capable of sliding in the axial direction along the raising and lowering groove.

3. The three-dimensional shaping device according to claim 2, comprising:

a shaping stand rotating shaft that supports the shaping stand; and an outer peripheral wall rotating shaft that supports the outer peripheral wall and has a shaft hole through which the shaping stand rotating shaft is inserted, wherein the raising and lowering groove is provided in the shaping stand rotating shaft, and the sliding projection is provided in the outer peripheral wall rotating shaft.

4. The three-dimensional shaping device according to claim 3, wherein the raising and lowering device is connected to the shaping stand rotating shaft via a bearing portion.

5. The three-dimensional shaping device according to claim 1, wherein a lower end of the outer peripheral wall is provided with a guiding member that guides rotation of the outer peripheral wall.

6. The three-dimensional shaping device according to claim 1, wherein lengths in a radial direction of the chute and the leveling plate are formed at not more than a radius of the shaping stand.

7. The three-dimensional shaping device according to claim 1, wherein a distance between the shaping stand and a lower end portion of the leveling plate gradually increases as an outer peripheral side is approached from a central side.

8. The three-dimensional shaping device according to claim 1, wherein an upper surface of the shaping stand is configured by a friction surface that improves frictional resistance with powder of a shaping material.

* * * * *